(12) United States Patent
Sanada

(10) Patent No.: US 8,793,446 B2
(45) Date of Patent: Jul. 29, 2014

(54) WRITING PROGRAM TYPES ONTO SYSTEM BOARDS IN A PARTITIONED COMPUTER SYSTEM

(75) Inventor: Noriyuki Sanada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 132 days.

(21) Appl. No.: 13/477,611

(22) Filed: May 22, 2012

(65) Prior Publication Data

US 2012/0297126 A1    Nov. 22, 2012

Related U.S. Application Data

(63) Continuation of application No. PCT/JP2009/006313, filed on Nov. 24, 2009.

(51) Int. Cl.
| | | |
|---|---|---|
| *G06F 9/44* | (2006.01) | |
| *G06F 12/08* | (2006.01) | |
| *G06F 9/50* | (2006.01) | |
| *G06F 12/06* | (2006.01) | |
| *G06F 15/177* | (2006.01) | |

(52) U.S. Cl.
CPC .......... *G06F 9/5077* (2013.01); *G06F 12/0646* (2013.01); *G06F 15/177* (2013.01); *G06F 2212/152* (2013.01)
USPC ............................ 711/158; 711/165; 718/104

(58) Field of Classification Search
CPC ....... G06F 8/71; G06F 9/4806; G06F 9/5061; G06F 9/5077; G06F 12/0684; G06F 12/0692; G06F 15/161; G06F 15/177; G06F 2212/152
USPC ................... 711/154, 165; 718/104
See application file for complete search history.

(56) References Cited

U.S. PATENT DOCUMENTS

2006/0225069 A1*  10/2006  Yuuki .......................... 717/170

FOREIGN PATENT DOCUMENTS

| JP | 61-278902 | 12/1986 |
|---|---|---|
| JP | 4-17040 | 1/1992 |
| JP | 6-252985 | 9/1994 |
| JP | 7-6114 | 1/1995 |
| JP | 7-295796 | 11/1995 |
| JP | 9-330106 | 12/1997 |
| JP | 2001-22708 | 1/2001 |
| JP | 2003-167752 | 6/2003 |
| JP | 2006-260330 | 9/2006 |

OTHER PUBLICATIONS

Japanese Notification of Reason for Refusal dated Apr. 30, 2013 in Japanese Application 2011-542982.
International Search Report of Corresponding PCT Application PCT/JP2009/006313 mailed Feb. 9, 2010.

* cited by examiner

*Primary Examiner* — Hal Schnee
(74) *Attorney, Agent, or Firm* — Staas & Halsey LLP

(57) ABSTRACT

An information processing apparatus includes a calculator configured to perform a calculation, a plurality of system boards, each of the plurality of system boards including a first storage unit that stores a first program of a first type, the first program being to be used to operate the calculator, a preliminary board including a plurality of second storage units, at least one of the plurality of second storage units storing a second program of a second type, the second program corresponding to the first programs, and a controller configured to compare any one of the first types of the first programs with the second type of the second program and to write, when any one of the first types does not match the second type, the first program of the any one of the first types into the second storage unit.

8 Claims, 9 Drawing Sheets

FIG. 6

| PRIORITY 31 | VERSION NUMBER OF FIRMWARE 32 |
|---|---|
| 1 | A |
| 2 | C |
| 3 | B |

30

33, 34, 35

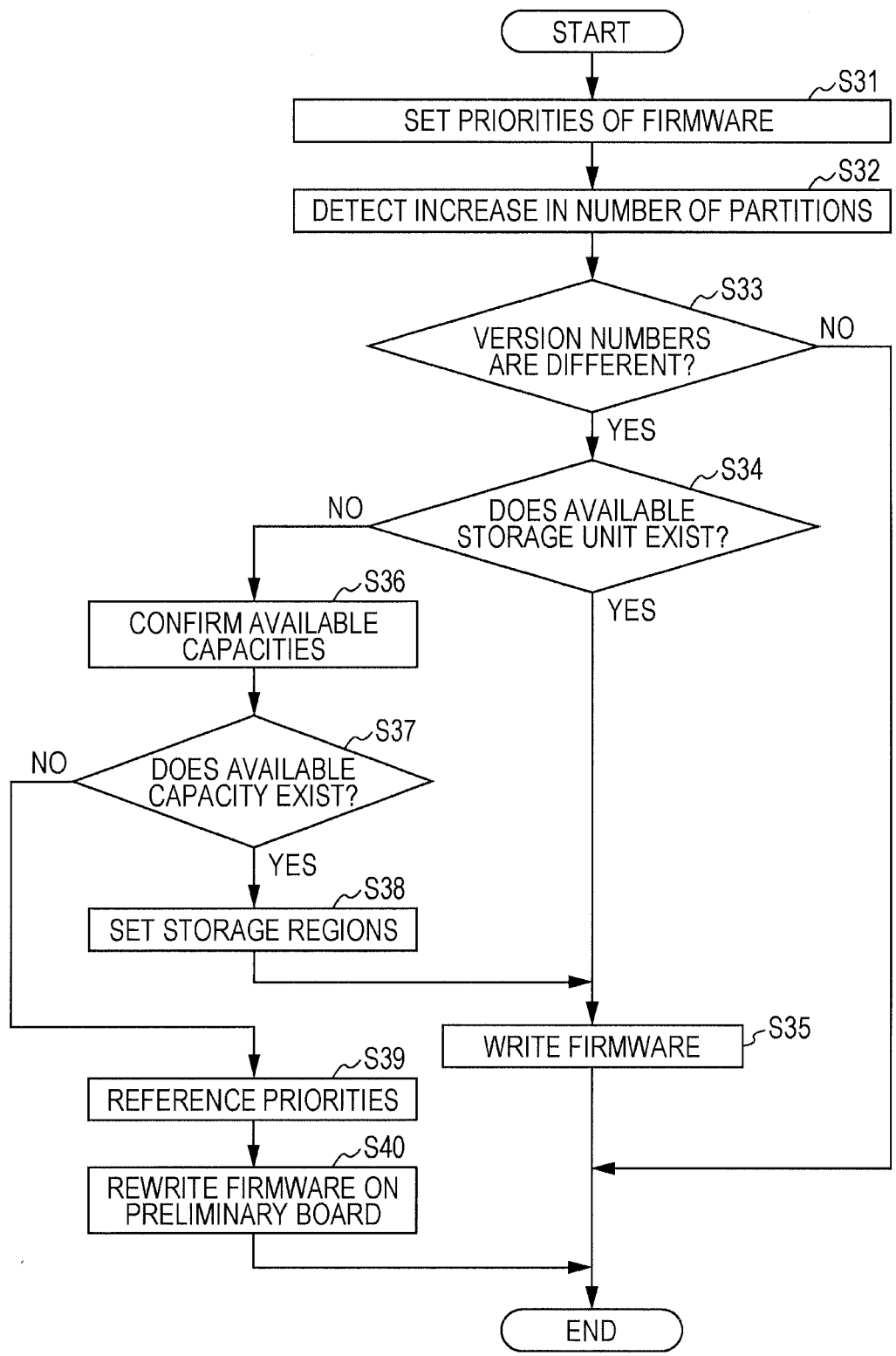

| STORAGE UNIT 41 | STARTING ADDRESS 42 | ENDING ADDRESS 48 | VERSION NUMBER OF FIRMWARE 43 | PARTITION NUMBER 47 |
|---|---|---|---|---|
| 11 | 0 | 99 | A | 2 |
| 12 | 0 | 99 | B | 3 |
| 12 | 100 | 199 | C | 9 |

44
45
46

US 8,793,446 B2

WRITING PROGRAM TYPES ONTO SYSTEM BOARDS IN A PARTITIONED COMPUTER SYSTEM

CROSS-REFERENCE TO RELATED APPLICATION

This application is based upon and claims the benefit of priority of the prior International Patent Application No. PCT/JP2009/006313, filed on Nov. 24, 2009, the entire contents of which are incorporated herein by reference.

FIELD

The embodiments discussed herein are related to an information processing apparatus, a non-transitory computer-readable medium storing an information processing program and a method for controlling an information processing apparatus.

BACKGROUND

An information processing apparatus that serves as a server apparatus that provides various services to a client apparatus includes hardware resources such as a memory and a central processing unit (CPU) that is divided into a plurality of partitions. Each of the partitions operates under an independent operating system (OS) and has one or more system boards. A CPU and a memory are mounted on each of the system boards, and the CPUs execute various processes requested to the information processing apparatus.

A program that is called firmware is installed on each of the system boards that form the partitions. The firmware that is installed on each of the system boards is executed when power is supplied to the system board. The firmware causes software for activating the OS to be read into the memory or causes an operating environment of a system to be set and the software for activating the OS to be executed. When one partition is made up of a plurality of system boards, version numbers of the firmware that is installed on the plurality of system boards belonging to the same partition are the same. The version numbers of the firmware are managed by a controller. The controller manages the firmware of the different version numbers as programs of different types.

In order to restore a partition that includes a system board when the system board fails, a preliminary system board (hereinafter referred to as preliminary board) is included in the information processing apparatus. The preliminary board does not belong to any of the partitions during a normal operation. When a failure occurs in any of the system boards that belong to the partitions, the system board in which the failure occurs is replaced with the preliminary board, and whereby the partition to which the system board in which the failure occurs belongs can be quickly restored.

In order to restore the partition as quickly as possible, it is preferable that firmware of the same version number as firmware installed on a system board in which a failure is likely to occur be installed on the preliminary board. However, when the information processing apparatus has the plurality of partitions and firmware of different version numbers is installed in the partitions, a plurality of preliminary boards are prepared for the number of the version numbers of the firmware.

A technique for managing a version number of a program installed on a system board on the basis of an operating environment of an information processing apparatus is known.

Japanese Laid-open Patent Publication Nos. 7-295796, 7-6114, and 4-17040 are examples of the related art.

SUMMARY

According to an aspect of the invention, an information processing apparatus includes a calculator configured to perform a calculation, a plurality of system boards, each of the plurality of system boards including a first storage unit that stores a first program of a first type, the first program being to be used to operate the calculator, a preliminary board including a plurality of second storage units, at least one of the plurality of second storage units storing a second program of a second type, the second program corresponding to the first programs, and a controller configured to compare any one of the first types of the first programs with the second type of the second program and to write, when any one of the first types does not match the second type, the first program of the any one of the first types into the second storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating a priority table;

FIG. 7 is a flowchart of operations of the controller when a partition is added;

FIG. 9 is a diagram illustrating a memory map stored in a nonvolatile memory.

DESCRIPTION OF EMBODIMENTS

Hereinafter, the present embodiments are described. It is noted that a combination of configurations described in embodiments is included in the present embodiments of the disclosure.

Figure 1:
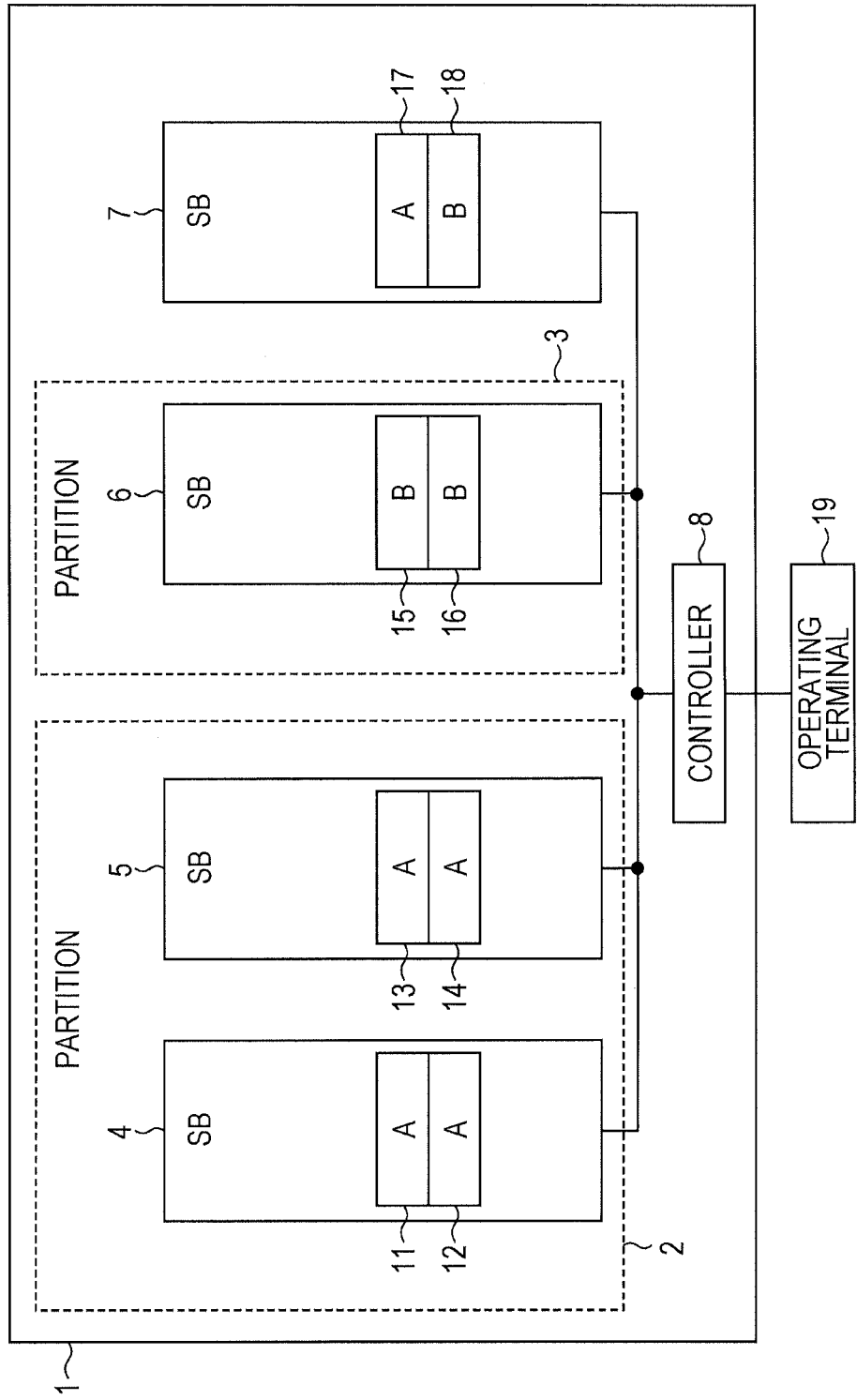
FIG. 1 is a block diagram illustrating an entire system of an information processing apparatus.

FIG. 1 is a block diagram illustrating an entire system of an information processing apparatus 1 according to the present embodiment. The information processing apparatus 1 can function as a server apparatus that provides services in response to requests provided from a plurality of clients. The information processing apparatus 1 includes a plurality of partitions 2, 3, a preliminary board 7 and a controller 8.

Each of the partitions 2 and 3 may include a plurality of system boards. In the present embodiment, the partition 2 includes two system boards 4 and 5, and the partition 3 includes one system board 6, for example.

The partitions 2 and 3 operate OSs that are provided for the partitions 2 and 3 and independent from each other. The system boards 4, 5 and 6 include CPUs, memories and storage units 11, 12, 13, 14, 15 and 16 as described below. For example, nonvolatile memories such as flash memories or electrically erasable and programmable read only memories (EEPROMs) may be used as the storage units 11 to 16. In the present embodiment, the two storage units 11 and 12 are mounted on the system board 4, the two storage units 13 and 14 are mounted on the system board 5, and the other two storage units 15 and 16 are mounted on the system board 6, for example. The storage units 11 to 16 each store firmware of one type. One of the storage units that are mounted on each of the system boards is preliminary. On each of the system boards 4, 5 and 6, when one of the storage units fails, the other preliminary storage unit becomes valid and inhibits an operation of the system board from stopping.

In the present embodiment, the version numbers of the firmware that is stored in the storage units 11 to 16 included in each of the partitions are the same. For example, firmware A is installed on each of the system boards 4 and 5 that belong to the partition 2, while firmware B is installed on the system board 6 that belongs to the partition 3.

When a failure occurs in any of the system boards 4, 5 and 6, the system board in which the failure occurs is replaced with the preliminary board 7. The preliminary board 7 includes a plurality of storage units 17 and 18. The number of storage units that are mounted on the preliminary board 7 is equal to or larger than the number of partitions that are included in the information processing apparatus 1.

In the present embodiment, the single preliminary board 7 is installed in the information processing apparatus 1. However, a plurality of preliminary boards 7 may be installed in the information processing apparatus 1. The reliability and availability of the information processing apparatus 1 when a failure occurs in any of the system boards 4, 5 and 6 can be improved by the installation of the plurality of preliminary boards 7.

The controller 8 is a control apparatus (service processor (SVP)), for example. The controller 8 manages all system operations of the information processing apparatus 1. The controller 8 has a dedicated CPU and a dedicated memory as described below. The controller 8 manages the system operations by causing the dedicated CPU to execute firmware read into the dedicated memory from the storage units 11 to 16. In addition, the controller 8 manages a power source of the information processing apparatus 1 on the basis of a request provided from the outside of the information processing apparatus 1 and manages whether or not a failure occurs in any of the partitions 2 and 3.

The controller 8 stores the firmware A installed in the partition 2 and the firmware B installed in the partition 3. When the preliminary board 7 is installed in the information processing apparatus 1, the controller 8 writes the stored firmware A and B in the storage units 17 and 18 mounted on the preliminary board 7. After the installation of the preliminary board 7 in the information processing apparatus 1, when the firmware with a different version number from the original number is rewritten on the preliminary board 7 assigned to any of the partitions 2 and 3, the controller 8 reads the rewritten firmware and stores the read firmware. The controller 8 writes firmware corresponding to the version number of the rewritten firmware in any of the storage units 17 and 18 of the preliminary board 7 for the partition to which the preliminary board 7 on which the firmware is rewritten is assigned.

An operating terminal 19 is a terminal (such as a console) that operates the information processing apparatus 1 through the controller 8. An administrator of the information processing apparatus 1 uses the operating terminal 19 to change the partitions, update the firmware, add a system board to the information processing apparatus 1, and the like.

When the controller 8 detects a failure of a system board that belongs to any of the partitions 2 and 3, the controller 8 assigns the preliminary board 7 to the partition to which the system board in which the failure occurs belongs, and the controller 8 stops the system board in which the failure occurs. Then, the controller 8 removes the system board in which the failure occurs from the partition. The controller 8 enables the firmware that is installed in any of the storage units 17 and 18 of the preliminary board 7 and has the same version number as the firmware installed on the other system board belonging to the partition to which the preliminary board 7 is assigned to.

The controller 8 performs the aforementioned operations and thereby can assign, to the partition in which the failure occurs in the system board, the preliminary board 7 on which firmware that includes firmware with a corresponding version number is written. Thus, the information processing apparatus 1 that includes the plurality of partitions that can each efficiently recover from a failure occurring in a system board can be provided.

Figure 2:
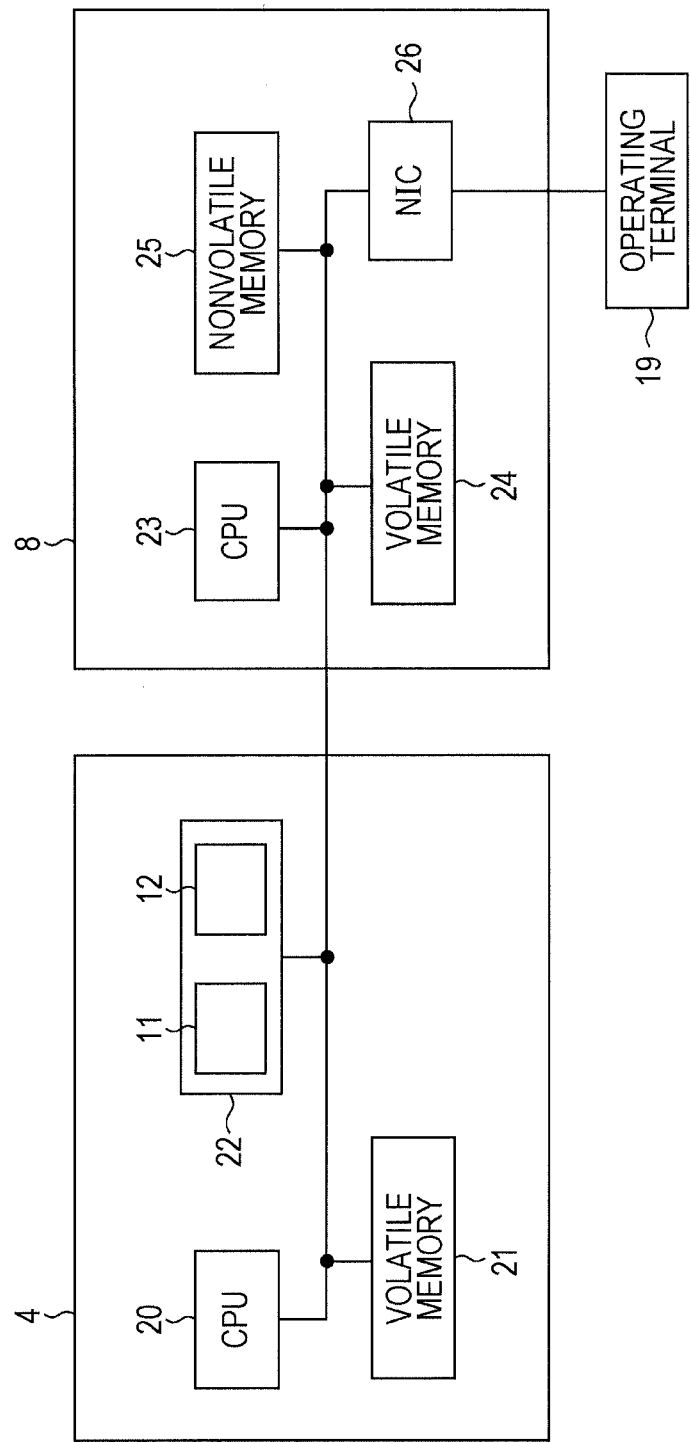
FIG. 2 is a block diagram illustrating the relationship between a system board and a controller.

FIG. 2 is a block diagram illustrating the relationship between the system board 4 and the controller 8. The other system boards 5 and 6 and the preliminary board 7 each have the same configuration as the system board 4. Connection relationships between the controller 8 and the system boards 5 and 6 are the same as a connection relationship between the controller 8 and the system board 4. In addition, a connection relationship between the controller 8 and the preliminary board 7 is the same as the connection relationship between the controller 8 and the system board 4. Thus, FIG. 2 illustrates only the connection relationship between the controller 8 and the system board 4. Illustrations of the connection relationships between the controller 8 and the system boards 5 and 6 and an illustration of the correction relationship between the controller 8 and the preliminary board 7 are omitted in FIG. 2.

The system board 4 includes a CPU 20, a volatile memory 21 and a nonvolatile memory 22. The CPU 20 functions as a calculator that executes the interested OS. A content that is stored in the volatile memory 21 is erased when a power source of the system board 4 is turned off. An example of the volatile memory 21 is a dynamic random access memory (DRAM). A content that is stored in the nonvolatile memory 22 is not erased even when the power source of the system board 4 is turned off. An example of the nonvolatile memory 22 is a flash memory. The CPU 20, the volatile memory 21 and the nonvolatile memory 22 are connected to each other through a common bus. The nonvolatile memory 22 includes the storage units 11 and 12.

The controller 8 includes a CPU 23, a volatile memory 24, a nonvolatile memory 25, a network interface card (NIC) 26. The NIC 26 connects the controller 8 to the external operating terminal 19 through a network so that the operating terminal 19 can control the controller 8 through the network such as a local area network (LAN). The CPU 23, the volatile memory 24, the nonvolatile memory 25 and the NIC 26 are connected to each other through a common bus.

The nonvolatile memory 25 stores firmware that controls the controller 8. The volatile memory 24 stores the firmware stored in the nonvolatile memory 22 of the system board 4 during the time when power is supplied to the system board 4. The controller 8 causes the CPU 23 to read the firmware stored in the nonvolatile memory 22 into the volatile memory 24 through the common bus. In addition, the controller 8 causes the CPU 23 to write the firmware stored in the memory 24 in the nonvolatile memory 22 through the common bus.

The common bus of the system board 4 and the common bus of the controller 8 are connected to each other. Thus, the controller 8 can control an operation of the system board 4 in accordance with a command transmitted by the operating terminal 19. In addition, the system board 4 can spontaneously transmit, to the controller 8, information of an event such as a failure occurring in the system board 4 or the like. The controller 8 can inform the operating terminal 19 of the event occurring in the system board 4.

Figure 3:
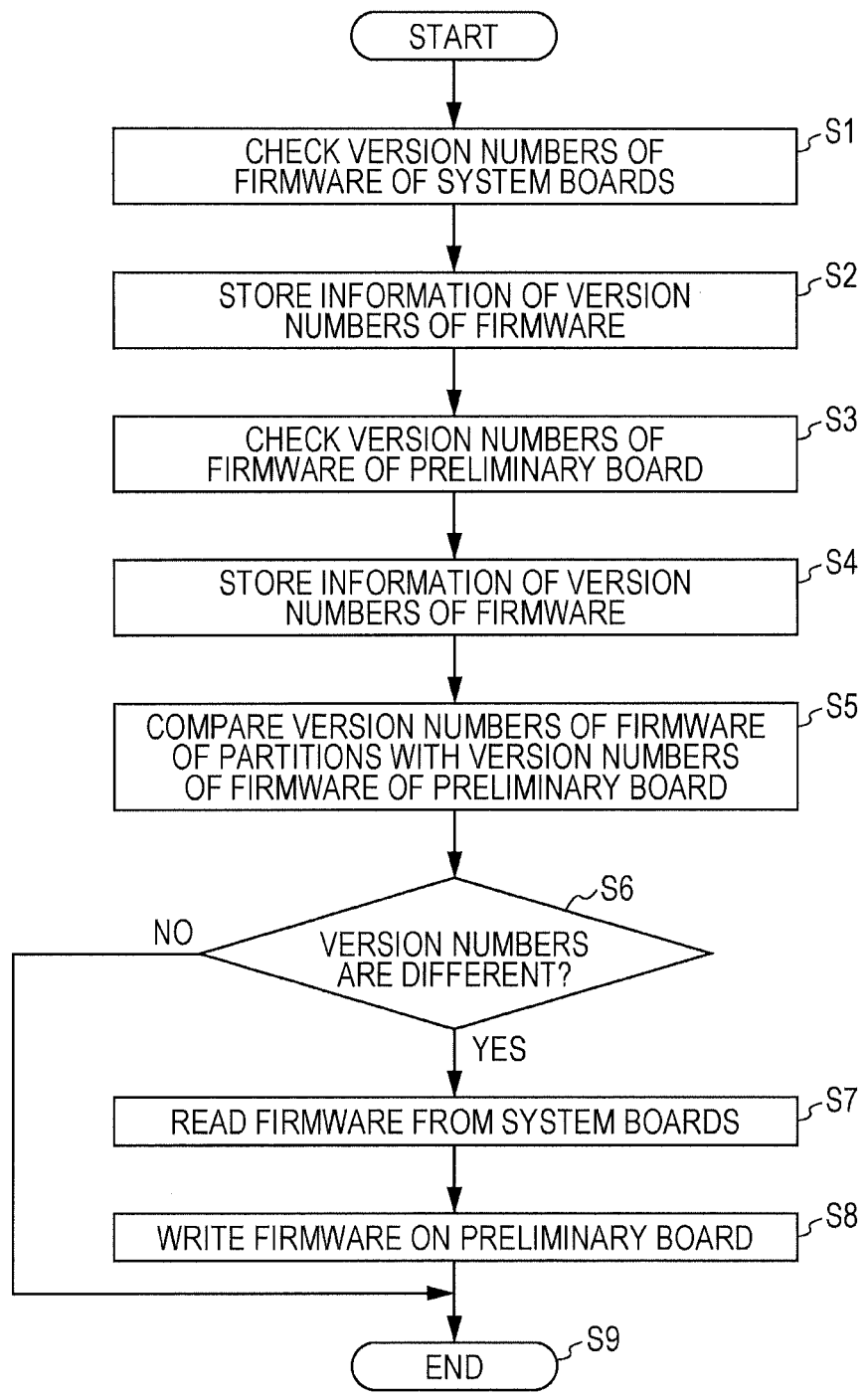
FIG. 3 is a flowchart of operations of the controller when a preliminary board is inserted.

FIG. 3 is a flowchart of operations of the controller 8 when the preliminary board 7 is inserted. The operations of the controller 8 are described on the basis of the block diagram of FIG. 1.

The controller 8 transmits, to the system boards 4 and 5 belonging to the partition 2 and the system board 6 belonging to the partition 3, a command to check the version number of the firmware written in the storage units 11 to 14 of the system boards 4 and 5 belonging to the partition 2 and the version number of the firmware written in the storage units 15 and 16 of the system board 6 belonging to the partition 3 (S1). The CPUs that are mounted on the system boards 4, 5 and 6 extract information of the version numbers of the firmware in response to the command transmitted from the controller 8 and transmit the extracted information to the controller 8. The controller 8 stores the information of the version numbers of the firmware in the volatile memory 24 (S2).

The controller 8 transmits, to the preliminary board 7 assigned to any of the partitions 2 and 3, a command to check the version numbers of the firmware written in the storage units 17 and 18 (S3). The preliminary board 7 transmits, to the controller 8, information of the version numbers of the firmware in response to the command transmitted from the controller 8. The controller 8 stores the information of the version numbers of the firmware in the volatile memory 24 (S4).

The CPU 23 of the controller 8 compares the information that is stored in the volatile memory 24 and indicates the version numbers of the firmware written in the storage units 11 to 16 of the system boards 4, 5 and 6, with the information that indicates the version numbers of the firmware written in the storage units 17 and 18 of the preliminary board 7 (S5).

When the information that is stored in the nonvolatile memory 24 and indicates the version numbers of the firmware written in the storage units 11 to 16 of the system boards 4, 5 and 6 is different from the information that indicates the version numbers of the firmware written in the storage units 17 and 18 of the preliminary board 7 (Yes in S6), the controller 8 reads the firmware from the storage units 11 to 16 of the system boards 4, 5 and 6 and stores the read firmware in the volatile memory 24 (S7). The controller 8 writes the stored firmware in any of the storage units 17 and 18 of the preliminary board 7 (S8). When the information that is stored in the nonvolatile memory 24 and indicates the version numbers of the firmware written in the storage units 11 to 16 of the system boards 4, 5 and 6 is the same as the information that indicates the version numbers of the firmware written in the storage units 17 and 18 of the preliminary board 7 (No in S6), the firmware of the preliminary board 7 is not rewritten, and the process illustrated in FIG. 2 is ended (S9).

The controller 8 performs the aforementioned operations and thereby can write, in the storage units 17 and 18 of the preliminary board 7, the firmware that has the version numbers and is executed on all the partitions 2 and 3.

Figure 4:
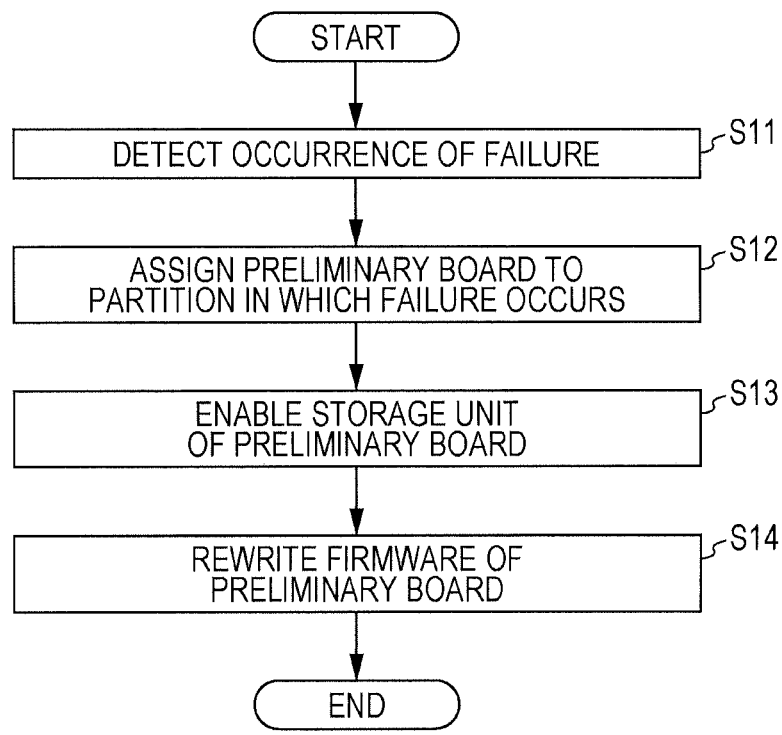
FIG. 4 is a flowchart of operations of the controller when a failure occurs.

FIG. 4 is a flowchart of operations of the controller 8 when a failure occurs in any of the system boards 4, 5 and 6 installed in the information processing apparatus 1. The controller 8 periodically transmits an operation check command to the system boards 4, 5 and 6 and detects a failure that occurs in any of the system boards 4, 5 and 6 (S11). In addition, the controller 8 receives operating state signals from the system boards 4, 5 and 6 at regular intervals and thereby can detect the failure that occurs in the one of the system boards 4, 5 and 6.

When the controller 8 detects that the failure occurs in the one of the system boards 4, 5 and 6, the controller 8 assigns the preliminary board 7 to a partition to which the system board in which the failure occurs belongs (S12). The controller 8 enables a storage unit that is among the storage units 17 and 18 of the preliminary board 7 and stores firmware that has a version number corresponding to the version number of the firmware of the system board belonging to the partition in which the failure occurs (S13).

The controller 8 writes the firmware stored in the enabled storage unit over the firmware stored in the storage unit that is among the storage units 17 and 18 of the preliminary board 7 and is not enabled (S14). The version numbers of the firmware stored in the two storage units 17 and 18 match each other so that the stored firmware is redundant. Thus, when a failure occurs in the enabled storage unit of the preliminary board 7, the information processing apparatus 1 can be continuously operated by enabling the other storage unit of the preliminary board 7.

Figure 5:
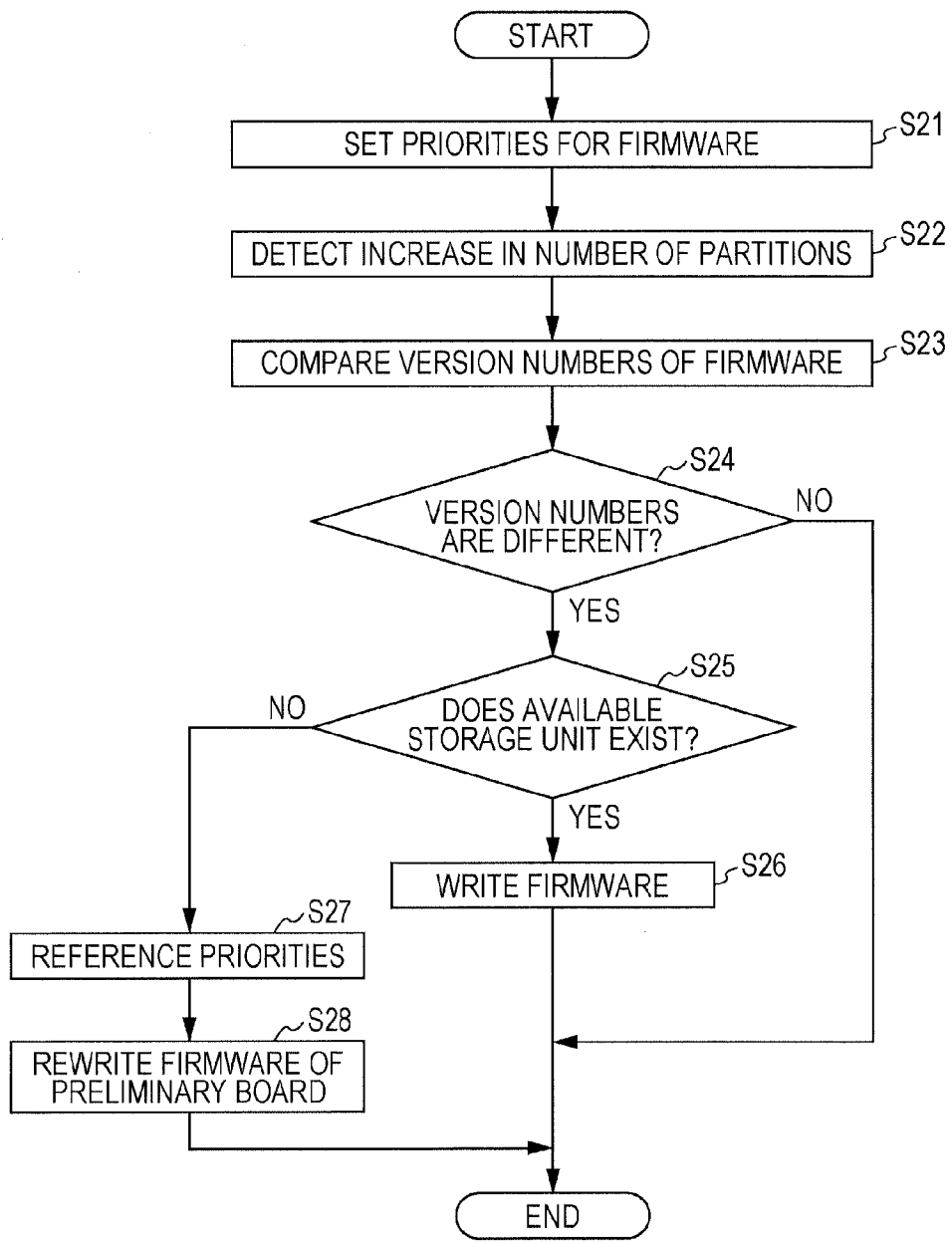
FIG. 5 is a flowchart of operations of the controller when a partition is added.

FIG. 5 is a flowchart of operations of the controller 8 when the number of partitions assigned to the information processing apparatus 1 is increased. An embodiment of the controller 8 when the number of all the partitions exceeds the number of the storage units mounted on the preliminary board 7 is described below.

The controller 8 sets priorities for version numbers of firmware to be stored in the storage units 17 and 18 of the preliminary board 7 on the basis of the configuration of the partitions that are included in the information processing apparatus 1 (S21). The controller 8 stores the set priorities in the volatile memory 24. The priorities may be stored as table data such as a priority table 30 (described later) in the volatile memory 24.

The controller 8 may set the priorities so that the higher the possibility that a partition in which firmware is installed causes the system to stop, the higher a priority to be set for the version number of the firmware installed in the partition. For example, the controller 8 sets the priorities so that the larger the number of system boards included in a partition in which firmware is installed, the higher the priority to be set for the version number of the firmware. A partition that includes a large number of system boards processes a large amount of tasks. When a system board that is included in the partition that includes the large number of system boards fails, the failure increases the possibility that the system goes down.

When a partition is made up of only a single system board and the single partition fails, the partition stops. Thus, the partition that is made up of only the single system board largely affects a stable operation of the information processing apparatus 1. The controller 8 may set a high priority for a version number of firmware installed in the partition that is made up of the single system board.

It is assumed that the possibilities that the system boards 4, 5 and 6 fail are equal. Based on the assumption, the larger the number of system boards on which firmware that has the same version number is installed, the higher the possibility that a failure occurs in a partition that is made up of the system boards on which the firmware that has the same version number is installed. As the number of system boards that operate with firmware that has the same version number increases, the controller 8 may set a higher priority for the version number of the firmware.

The controller 8 may monitor a time to activate each of the partitions 2 and 3 and a time to stop each of the partitions 2 and 3 and may set the priorities for the version numbers of the firmware on the basis of time periods in which the system boards 4, 5 and 6 that belong to the partitions 2 and 3 are driven. The system boards 4 and 5 may each transmit information of the time to activate the partition 2 and information of the time to stop the partition 2 to the controller 8. The system board 6 may transmit information of the time to activate the partition 3 and information of the time to stop the partition 3 to the controller 8. The controller 8 stores, in the volatile memory 24, the total of the time periods in which system boards 4, 5 and 6 are driven, on the basis of the transmitted information of the times to activate the partitions 2 and 3 and the transmitted information of the times to stop the partitions 2 and 3. It is assumed that the longer the stored total time period in which the system boards 4, 5 and 6 are driven, the higher the possibility that a failure occurs. Based on this assumption, the controller 8 sets priorities for the version numbers of the firmware installed on the system boards 4, 5 and 6 on the basis of the stored total time period in which the system boards 4, 5 and 6 are driven. The controller 8 writes, on the basis of the set priorities, the firmware in the nonvolatile memory 22 that includes the storage units 17 and 18 of the preliminary board 7.

The priorities of the version numbers of the firmware may be set in the controller 8 on the basis of how and why a failure has occurred in the past in the information processing apparatus 1. This is due to the fact that a failure rate is not simply determined on the basis of a load of a calculation process, a configuration or the like.

FIG. 6 is a diagram illustrating the priority table 30 that is stored in the nonvolatile memory 25. The priorities are set in a column 31 in the priority table 30. The version numbers of the firmware, which are associated with the priorities, are set in a column 32 in the priority table 30. It is assumed that the lower the number of the priority set in the column 31, the higher the priority. In the priority table 30, a row 33 indicates that the version number of the firmware that has the first priority is A. In the priority table 30, a row 34 indicates that the version number of the firmware that has the second priority is C. In the priority table 30, a row 35 indicates that the version number of the firmware that has the third priority is B.

Return to FIG. 5. When a system board that is assigned to a new partition is added to the information processing apparatus 1 or when a part of a plurality of system boards that form a single partition is assigned to another new partition, the system board that is assigned to the new partition transmits partition information to the controller 8. The controller 8 detects, on the basis of the partition information received from the system board, that the number of the partitions has increased (S22).

The CPU 23 of the controller 8 reads the version number of firmware installed on the newly added system board and compares the read version number of the firmware with the version numbers of the firmware stored in the storage units 17 and 18 of the preliminary board 7 (S23). When the version number of the firmware installed on the newly added system board is the same as the version number of the firmware stored in any of the storage units 17 and 18 of the preliminary board 7 (No in S24), the CPU 23 terminates the process illustrated in FIG. 5.

When the version number of the firmware installed on the newly added system board is different from the version numbers of the firmware stored in the storage units 17 and 18 of the preliminary board 7 (Yes in S24), and the preliminary board 7 has an available storage unit in which firmware that has a version number corresponding to any of the partitions is not written (Yes in S25), the CPU 23 of the controller 8 writes, in the available storage unit of the preliminary board 7, firmware with a version number corresponding to the version number of the firmware installed on the system board belonging to the newly added partition (S26). On the other hand, when the preliminary board 7 does not have an available storage unit (No in S25), the controller 8 references the priorities of the priority table 30 stored in the nonvolatile memory 25 (S27). The CPU 23 references a storage unit that is among the storage units 17 and 18 of the preliminary board 7 and stores firmware that has a version number whose priority is the lowest. The CPU 23 writes, over the firmware stored in the referenced storage unit, the firmware that has the version number corresponding to the version number of the firmware installed on the system board belonging to the newly added partition (S28).

Since the priorities are set for the version numbers of the firmware in the priority table 30 in the aforementioned manner in advance, the firmware can be stored on the basis of the priority of the version number of the firmware regardless of the fact that the preliminary board 7 does not have an available region for storing the firmware. As a result, the reliability of the information processing apparatus 1 can be improved.

FIG. 7 is a flowchart of operations of the controller 8 when the number of partitions assigned to the information processing apparatus 1 is increased. Another embodiment of the controller 8 when the number of partitions is increased and thereby exceeds the number of the storage units mounted on the preliminary board 7 is described below.

The CPU 23 of the controller 8 sets priorities for the version numbers of the firmware stored in the storage units 17 and 18 of the preliminary board 7 on the basis of the configuration of the partitions included in the information processing apparatus 1 (S31). A method for setting the priorities is the same as the setting method described in the aforementioned embodiment with reference to FIG. 5. The set priorities are stored in the nonvolatile memory 25 included in the controller 8, for example.

When a system board that is assigned to a new partition is added to the information processing apparatus 1 or when a part of a plurality of system boards that form a single partition is assigned to another new partition, the system board that is assigned to the new partition transmits partition information to the controller 8. The controller 8 detects, on the basis of the partition information received from the system board, that the number of partitions has increased (S32).

When the version number of firmware installed on the system board assigned to the new partition or the version number of firmware installed on the system board that is among the plurality of system boards forming the single partition and is assigned to the other new partition is the same as the version number of the firmware stored in any of the storage units 17 and 18 of the preliminary board 7 (No in S33), the CPU 23 of the controller 8 terminates the process illustrated in FIG. 7.

When the version number of the firmware installed on the system board assigned to the new partition or the version number of the firmware installed on the system board that is among the plurality of system boards forming the single partition and is assigned to the other new partition is different from the version numbers of the firmware stored in the storage units 17 and 18 of the preliminary board 7 (Yes in S33), and the preliminary board 7 has an available storage unit in which firmware that has a version number corresponding to the version number of the firmware installed on the system boards belonging to the partitions is not written (Yes in S34), the CPU 23 writes, in the available storage unit of the preliminary board 7, the firmware that has the version number corresponding to the newly added partition (S35).

When the preliminary board 7 does not have an available storage unit (No in S34), the CPU 23 transmits, to the preliminary board 7, a command to confirm available capacities of storage regions of the storage units 17 and 18 of the preliminary board 7 (S36). When the preliminary board 7 has an available capacity for storing the firmware as a result of the confirmation (Yes in S37), the CPU 23 transmits, to the preliminary board 7, a command to divide a single storage unit into a plurality of storage regions (S38).

The storage regions are the plurality of regions included in the single storage unit. The preliminary board 7 receives the command from the CPU 23 of the controller 8 and sets two storage regions in the single storage unit (S39). The controller 8 writes the firmware corresponding to the added system board in one of the two set storage regions (S35).

Since the storage unit is divided into the storage regions, the controller 8 can seemingly increase the number of storage units that are included in the preliminary board 7 and configured to store the firmware. Since the number of the storage units included in the preliminary board 7 increases, the preliminary board 7 can store a larger quantity of firmware that is installed on any of the system boards. As a result, a system board in which a failure occurs can be quickly replaced with the preliminary board 7, and whereby the reliability and availability of the information processing apparatus 1 can be improved.

The data memory capacities of the storage units are limited. Thus, even when the number of storage regions is increased by dividing the storage units, the quantity of firmware to be stored is limited. When the number of storage regions is increased and the preliminary board 7 does not have an available capacity for storing the firmware (No in S37), the controller 8 references the priorities stored in the priority table 30 (S39).

The CPU 23 of the controller 8 references a storage region that is included in the preliminary board 7 and stores firmware with a version number whose priority is the lowest in the priority table 30. The CPU 23 rewrites, in the referenced storage region, the firmware that has the version number corresponding to the version number of the firmware installed on the system board belonging to the newly added partition (S40).

Since the priorities of the version numbers of the firmware are set in the priority table 30 in the aforementioned manner, the firmware can be stored in the storage region of the preliminary board 7 on the basis of the priority regardless of the fact that the preliminary board 7 does not have an available region for storing the firmware. The reliability and availability of the information processing apparatus 1 can be improved by storing the firmware with a larger number of version numbers in the nonvolatile memory 22 of the preliminary board 7.

Figure 8A:
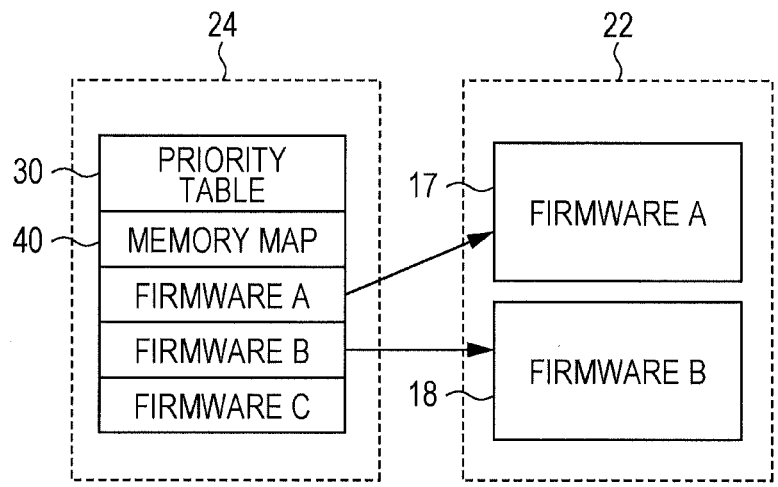
FIG. 8A is a diagram illustrating the relationship between the structure of data stored in a volatile memory included in the controller and the structure of data stored in a nonvolatile memory included in the preliminary board before the number of storage regions is increased.
Figure 8B:
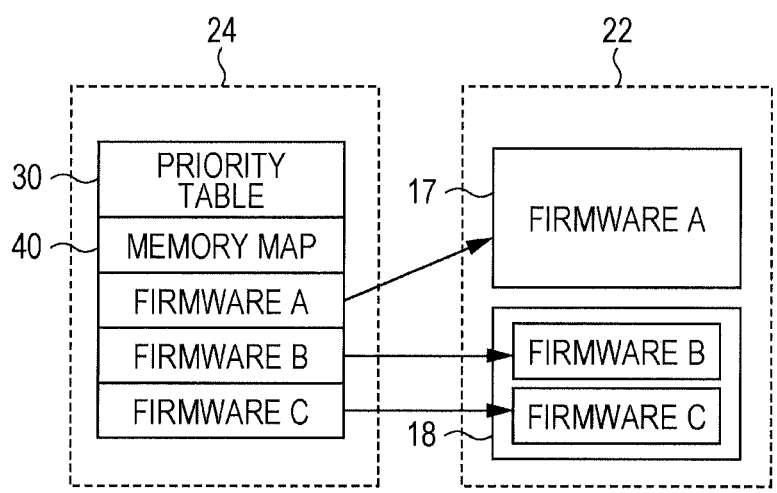
FIG. 8B is a diagram illustrating the relationship between the structure of the data stored in the volatile memory included in the controller and the structure of data stored in the nonvolatile memory included in the preliminary board after the number of the storage regions is increased.

FIGS. 8A and 8B are diagrams each illustrating the relationship between the structure of data stored in the volatile memory 24 of the controller 8 and the structure of data stored in the nonvolatile memory 22 of the preliminary board 7 when a partition is added.

FIG. 8A is the diagram illustrating the relationship between the structure of the data stored in the in the volatile memory 24 of the controller 8 and the structure of data stored in the nonvolatile memory 22 of the preliminary board 7 when the partition is added and firmware C is newly detected and before the number of storage regions is increased. The nonvolatile memory 24 stores the priority table 30, a memory map 40, the firmware A and the firmware B before the firmware C is detected. In addition, the nonvolatile memory 24 stores the newly detected firmware C. The memory map 40 indicates which version number of firmware is stored in each of the storage regions that are included in the nonvolatile memory 22 of the preliminary board 7 and start at addresses.

The nonvolatile memory 22 of the preliminary board 7 includes the storage units 17 and 18. The storage unit 17 stores the firmware A, while the storage unit 18 stores the firmware B. The controller 8 references the memory map 40 and thereby can confirm that a storage region for storing the newly detected firmware C does not exist in the state illustrated in FIG. 8A.

FIG. 8B is the diagram illustrating the relationship between the structure of the data stored in the in the volatile memory 24 and the structure of data stored in the nonvolatile memory 22 of the preliminary board 7 when the storage unit 18 is divided into storage regions so that the number of storage regions is increased. When an available memory space exists in the storage regions of the storage unit 18, the controller 8 divides the storage unit 18 into the storage regions and thereby forms the storage regions for newly storing firmware.

A memory map for the formed storage regions is written in the memory map 40 stored in the volatile memory 24. The controller 8 references the memory map 40 and thereby can confirm which version number of firmware is stored in which storage region among the storage regions of the nonvolatile memory 22 of the preliminary board 7. In addition, the controller 8 references the memory map 40 and thereby can confirm an available region of the nonvolatile memory 22 of the preliminary board 7.

FIG. 9 is a table diagram illustrating the memory map 40. The memory map 40 indicates version numbers of firmware stored in the storage regions of the storage units. In the memory map 40, a column 41 indicates numbers of the storage units. In the memory map 40, a column 42 indicates starting addresses of the storage units, and a column 48 indicates ending addresses of the storage units. In the memory map 40, a column 43 indicates the version numbers of the firmware stored at the addresses of the storage units, and a column 47 indicates numbers of partitions corresponding to the firmware with the version numbers.

In the memory map 40, a row 44 indicates that the firmware with the version number A corresponds to the partition 2 and is stored in a storage region that is included in the storage unit 11 and exists in a range of a starting address 0 of the storage unit 11 to an ending address 99 of the storage unit 11. In the memory map 40, a row 45 indicates that the firmware with the version number B corresponds to the partition 3 and is stored in a storage region that is included in the storage unit 12 and exists in a range of a starting address 0 of the storage unit 12 to an ending address 99 of the storage unit 12. In the memory map 40, a row 46 indicates that the firmware with the version number C corresponds to a partition 9 and is stored in a storage region that is included in the storage unit 12 and exists in a range of a starting address 100 of the storage unit 12 to an ending address 199 of the storage unit 12.

When a failure occurs in any of the partitions included in the information processing apparatus 1, the controller 8 references the memory map 40. By referencing the memory map 40, the controller 8 can confirm which storage region of the nonvolatile memory 22 of the preliminary board 7 stores firmware with a version number corresponding to the partition in which the failure occurs, and the controller 8 can also confirm addresses at which the firmware with the version number corresponding to the partition in which the failure occurs is stored. The controller 8 enables the firmware that has the version number and is stored in the confirmed storage region, as described above. Thus, the controller 8 can quickly restore the information processing apparatus 1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a first system board including a first memory storing a first program and a first processor coupled to the first memory and configured to perform a calculation based on the first program;
a second system board including a second memory storing a second program and a second processor coupled to the second memory and configured to perform a calculation based on the second program;
a preliminary board including a third memory storing the first program, a fourth memory storing the second program and a third processor coupled to the third memory and the fourth memory; and
a controller configured to store the first program in the third memory and to store the second program in the fourth memory, wherein
when the first system board is replaced with the preliminary board, the third memory is activated, and the second program stored in the fourth memory is rewritten to the first program.

2. The information processing apparatus of claim 1, further comprising:
a third system board including a fifth memory storing a third program and a fourth processor coupled to the fifth memory and configured to perform a calculation based on the third program, wherein
the controller is configured to include priority information, the priority information providing priorities for the first program, the second program and the third program, and
the controller is configured to write any one of the first program, the second program and the third program into any one of the third memory and the fourth memory on the basis of the priority information.

3. The information processing apparatus of claim 1, further comprising:
a third system board including a fifth memory storing a third program and a fourth processor coupled to the fifth memory and configured to perform a calculation based on the third program, wherein,
the controller divides a storage region of the third memory into a plurality of divided storage regions and writes the third program into one of the divided storage regions.

4. The information processing apparatus of claim 2, wherein the controller is configured to store driving time periods for the first system board, the second system board and the third system board, each of the system boards being driven during the corresponding time period, and to set the priorities for the first program, the second program and the third program on the basis of the driving time periods.

5. A non-transitory, computer-readable medium that stores a control program causing a computer to execute a procedure for controlling an information processing apparatus including a first system board including a first memory storing a first program and a first processor coupled to the first memory and configured to perform a calculation based on the first program, a second system board including a second memory storing a second program and a second processor coupled to the second memory and configured to perform a calculation based on the second program, and a preliminary board including a third memory storing the first program, a fourth memory storing the second program and a third processor coupled to the third memory and to the fourth memory, the procedure comprising:
storing the first program in the third memory and storing the second program in the fourth memory; and
activating the third memory and storing the first program in the fourth memory when the first system board is replaced with the preliminary board.

6. The non-transitory, computer-readable medium according to claim 5, wherein the information processing apparatus further comprises a third system board including a fifth memory storing a third program and a fourth processor coupled to the fifth memory and configured to perform a calculation based on the third program, and wherein the procedure further comprises:
setting priorities for the first program, the second program and the third program, and
writing any one of the first program, the second program and the third program into any one of the third memory and the fourth memory on the basis of the priority information.

7. A method for controlling an information processing apparatus including, a first system board including a first memory storing a first program and a first processor coupled to the first memory and configured to perform a calculation based on the first program, a second system board including a second memory storing a second program and a second processor coupled to the second memory and configured to perform a calculation based on the second program, and a preliminary board including a third memory storing the first program, a fourth memory storing the second program and a third processor coupled to the third memory and to the fourth memory, the method comprising:
storing the first program in the third memory and storing the second program in the fourth memory; and
activating the third memory and storing the first program in the fourth memory when the first system board is replaced with the preliminary board.

8. The method of claim 7, wherein the information processing apparatus further comprises a third system board including a fifth memory storing a third program and a fourth processor coupled to the fifth memory and configured to perform a calculation based on the third program, and wherein the method further comprises:
setting priorities for the first program, the second program and the third program, and writing any one of the first program, the second program and the third program into any one of the third memory and the fourth memory on the basis of the priority information.

* * * * *